United States Patent Office 3,376,308
Patented Apr. 2, 1968

3,376,308
CERTAIN PYRIDINIUM, QUINOLINIUM AND ISO-
QUINOLINIUM SULFOBETAINE DERIVATIVES
AND A METHOD FOR THEIR PREPARATION
Wolfgang Gündel, Dusseldorf-Oberkassel, Germany, assignor to Dehydag Deutsche Hydrierwerke G.m.b.H., Dusseldorf, Germany, a corporation of Germany
No Drawing. Filed Jan. 15, 1964, Ser. No. 337,723
Claims priority, application Germany, Feb. 2, 1963,
D 40,815
The portion of the term of the patent subsequent to
Oct. 18, 1983, has been disclaimed
6 Claims. (Cl. 260—294.8)

ABSTRACT OF THE DISCLOSURE

This invention relates to a mixture of thiosulfobetaines of the formula

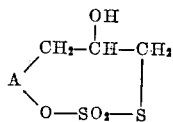

and

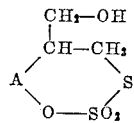

wherein A represents a pentavalent nitrogen compound selected from the group consisting of pyridinium, quinolinium, isopuinolinium and substituted derivatives thereof containing substituents selected from the group consisting of lower alkyl groups and halogens as well as the process for producing the same. The thiosulfobetaines of the invention are useful additives in copper electroplating baths where they produce an improved leveling effect in conjunction with known brightening agents.

One object of the invention is the obtention of novel mixtures of isomeric thiosulfobetaines containing hydroxyl groups of aromatic heterocyclic bases.

Another object of the invention is the production of a mixture of thiosulfobetaines of the formula

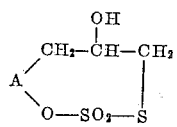

and

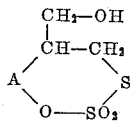

wherein A represents a pentavalent nitrogen compound selected from the group consisting of pyridinium, quinolinium, isoquinolinium and substituted derivatives thereof containing substituents selected from the group consisting of lower alkyl groups and halogens.

A further object of the invention is the development of a process for the production of a mixture of isomeric thiosulfobetaines containing hydroxyl groups of heterocyclic bases containing a pentavalent nitrogen atom which comprises the steps of reacting an aromatic heterocyclic compound in which a tertiary nitrogen atom is part of the heterocyclic aromatic ring with epichlorohydrin in the presence of water and in the presence of an agent capable of neutralizing a base, reacting the quaternary salt obtained with a neutral thiosulfate salt in the presence of water, and recovering said mixture of isomeric thiosulfobetaines.

A further object of the invention is the development of a process for the production of a mixture of thiosulfobetaines of the formula

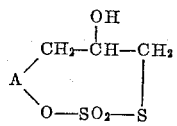

and

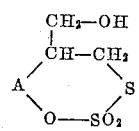

wherein A represents a pentavalent nitrogen compound selected from the group consisting of pyridinium, quinolinium, isoquinolinium and substituted derivatives thereof containing substituents selected from the group consisting of lower alkyl groups and halogens, which comprises the steps of reacting an aromatic nitrogen compound selected from the group consisting of pyridine, quinoline, isoquinoline and substituted derivatives thereof containing substituents selected from the group consisting of lower alkyl groups and halogens, with epichlorohydrin in the presence of water at a pH which does not exceed 8 during the reaction, said pH being controlled by the gradual introduction of an acid, reacting the resultant mixed isomers of the formula

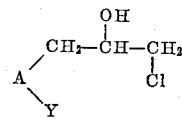

and

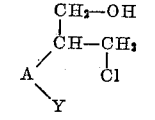

wherein A has the above-noted meaning and Y represents the anion of an acid, with a neutral thiosulfate salt in the presence of water, and recovering said mixture of isomeric thiosulfobetaines.

These and other objects of the invention will become more apparent as the description thereof proceeds.

It has been found that novel, useful thiosulfobetaines containing hydroxyl groups of heterocyclic bases are obtained by reacting unsubstituted or substituted aromatic heterocyclic bases, that is, those in which a tertiary nitrogen atom is part of an aromatic system, with epichlorohydrin in the presence of water and in the presence of a base-binding agent, and subsequently reacting the quaternary salts thus obtained, which contain organically bonded chlorine, with salts of thiosulfuric acid.

The formation and structure of these thiosulfobetaines is elucidated from the following reaction formulas, which illustrate an example in which water-containing pyridine is reacted with epichlorohydrin in the presence of hydrochloric acid as a base-binding agent in a first process step, and subsequently the quaternary salt formed thereby is reacted in a second process step with sodium thiosulfate.

(1)
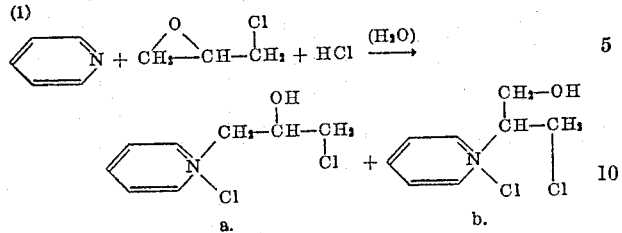
a.    b.

(2a)
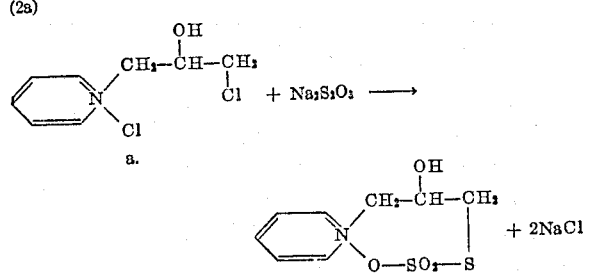
a.

(2b)
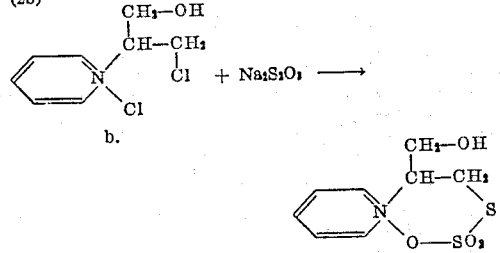
b.

The criticality of the process depends to a decisive degree upon the fact that the free ammonium bases formed in the first reaction step are neutralized immediately upon their formation. Under the conditions of the first reaction step the organically bonded chlorine atom may easily be split off and undesirable products may be formed if the reaction is performed without neutralization of the free ammonium bases. As found, the reaction proceeds exclusively in the direction of the above reaction equations if the initially formed ammonium bases are continuously neutralized by the concurrent use of a base-binding agent.

In practice, the process is advantageously performed by dissolving or suspending pyridine or one of its derivatives in water and, after addition of a few drops of a phenolphthalein solution, adding an equimolar amount of epichlorohydrin. As soon as the mixture begins to become reddish—which, as a rule, is the case after only a few moments—the addition of an aqueous mineral acid of known concentration is begun, which is then continued according to the degree of progress of the reaction in such a way that the hydrogen ion concentration of the mixture remains between pH 7 and pH 8 and never exceeds the pH value of 8. This is easily recognized and accomplished with the aid of the indicator that was added. Even more advantageous than the use of a color indicator is the insertion into the reaction mixture of an electromatically indicating pH-measuring device, which continuously registers the pH-value. The temperature, which slowly rises during this reaction, is maintained at 40° C. by occasional cooling. The reaction is complete and has been correctly performed when almost exactly one equivalent of acid has been introduced without the pH of the reaction mixture changing over into the acid range toward the end of the addition of acid. When particularly reactive pyridine bases are used, it has been found to be advantageous to provide a portion of the required acid, for instance, half of it, together with the base, that is, to introduce a substantial portion of the base into the reaction in the form of a salt. By virtue of this measure the hydrogen ion concentration practically regulates itself within the desired range at the beginning of the reaction. No change is thereby introduced into the overall course of the reaction, as it is brought out in reaction Equation 1, because the free quaternary base, as the stronger base, takes up the acid bonded to the pyridine base and releases the pyridine base for the ensuing reaction. This measure also offers an additional advantage in conjunction with the use of pyridine derivatives which are difficultly soluble in water. Some of these pyridine derivatives are considerably soluble in the concentrated aqueous solutions of their own salts and are, in this form, more readily accessible to the reaction.

For transformation into the thiosulfobetaines according to the present invention pursuant to reaction Equation 2a or 2b, an equivalent amount of a neutral thiosulfate, possibly dissolved in a small amount of water, is added to the completely reacted, weakly alkaline aqueous mixture. Any neutral salt of thiosulfuric acid, such as the alkali metal thiosulfates may be employed, however, for reasons of economy, commercial crystallized sodium thiosulfate is used therefor as a rule. The mixture is then heated for several hours to temperatures between about 40° C. and 100° C., preferably between about 80° C. and 90° C., accompanied by stirring.

In order to isolate the mixture of isomeric thiosulfobetaines formed thereby, it is preferable to first dehydrate the reaction mixture, preferably under vacuo and then, in order to separate the inorganic components, to treat the crystallizate which remains with suitable organic solvents wherein the inorganic components are insoluble. Primarily suitable for this purpose are lower alkanols, such as methanol, ethanol and isopropanol. Since the thiosulfobetaines are generally more difficulty soluble in cold water than the inorganic salts formed along with them, the isolation of the thiosulfobetaines may also be effected by recrystallizing the crystallizate from an amount of water such that the inorganic salts remain in solution, or by evaporating the reaction solution only to such an extent or to use only so much water to begin with that only the desired thiosulfobetaines crystallize out.

The process is capable of general application inasmuch as not only pyridine but also other aromatic heterocyclic bases containing a tertiary nitrogen as part of the heterocyclic ring are accessible to the reaction or sequence of reactions. Examples of suitable heterocyclic bases are pyridine, quinoline, isoquinoline and substituted derivatives thereof containing lower alkyl and/or halogen substituents. The following substituted pyridine compounds are examples of those compounds utilizable in the process: 3- or 4-chloropyridine, 2-, 3- or 4-methylpyridine (picolines), 2-, 3- or 4-ethylpyridine, 2,3-, 2,4-, 2,5-, 2,6- or 3,5-dimethylpyridine (butidines), 2-methyl-5-ethylpyridine, 4-methyl-3-ethylpyridine, 4-isopropyl-pyridine, 4-tert.butyl-pyridine, 2,3,4- or 2,4,6-trimethyl-pyridine (collidines), 2,4- or 3,4-diethylpyridine, 3,5-dimethyl-2-ethyl-pyridine, 2,6-dimethyl-4-ethyl-pyridine, quinoline, 4-methylquinoline, isoquinoline, 2-chloroquinoline, 2-methylquinoline (quinaldine), and the like.

Primarily suitable as base-binding agents or agents capable of neutralizing a base are mineral acids of all types, such as hydrochloric acid, sulfuric acid, phosphoric acid and the like, or acid salts of these acids, which, because of the easy separability of their salts, are used as a rule when it is desired to obtain salt-free end products. However, organic carboxylic acids or sulfonic acids, such as formic acid, acetic acid, propionic acid, hydroxy-propane-sulfonic acid, toluene-sulfonic acid and the like, may also be used.

The thiosulfobetaines obtained in accordance with the present invention are colorless, well crystallized compounds, which are very readily soluble in water, with a neutral reaction, and in general very difficultly soluble in organic solvents other other than alkanols. The thiosulfobetaines are useful additives for acid copper electroplating baths, wherein they produce an improved leveling effect in conjunction with known brightening agents.

The following examples are illustrative of the present invention and will enable others skilled in the art to understand the invention more completely. It is to be understood, however, that the following examples are not to be construed as limitations on the practice of the invention.

Example I

A few drops of phenolphthalein solution and 46.2 parts by weight of epichlorohydrin (0.5 mol) were added to a vigorously stirred mixture of 39.5 parts by weight of pyridine (0.5 mol) and 80 parts by volume of water. As soon as the color of the mixture changed to red—which occurred immediately, as a rule—the addition of a 2 N hydrochloric acid solution was begun. Thereafter, the hydrochloric acid solution was continuously added pursuant to the progress of the reaction so that the basicity of the reaction mixture always remained in the range of the indicator turning point and the color of the mixture never changed to red. During that time, the temperature was allowed to rise to 40° C. and was thereafter maintained at that level. When this operation was conscientiously performed, it was possible to add practically the entire theoretically possible amount of 2 N hydrochloric acid (250 parts by weight—0.5 mol) without the reaction changing into the acid range.

After the required amount of hydrochloric acid had been added, the reaction mixture was stirred for some additional time, and then 124 parts by weight of crystalline sodium thiosulfate ($Na_2S_2O_3 \cdot 5H_2O$) (0.5 mol) dissolved and the same amount of water was added. After heating the reaction mixture for 3 hours at 80 to 90° C., it was evaporated—advantageously under reduced pressure—to a total weight of 450 parts by weight and was then allowed to stand in a cool place to permit crystallization to proceed. 71 parts by weight of pyridinium-N-(hydroxypropyl-thiosulfobetaine) were obtained. By evaporation of the mother liquor, additional amounts of the product were obtained, so that the total yield was more than 65% of theory. For further purification, the crystallization was repeated from a small amount of water and an analytically pure product was obtained. The thiosulfobetaine, which separates in the form of massive crystals, has a melting point of 192 to 196° C. (decomposition).

When an acid copper electroplating bath comprising per liter: 210 gm. of copper sulfate, 60 gm. of sulfuric acid, 2 gm. of a condensation product of 1 mol of fatty alcohol and 8 mols of ethylene oxide and, as a brightening agent, 60 gm. of N,N-diethyl-dithiocarbamyl-S-ethane-ω-sodium sulfonate, is modified with 50 mgm. of pyridinium-N-(hydroxypropyl-thiosulfobetain) obtained above, a bright and well leveled copper electrodeposit is obtained within a curent density range of 3 to 8 amp./dm.² when sheet metal is electroplated in this bath. Without this additive the electrodeposits are also bright, but do not exhibit any leveling effect.

In place of the pyridinium-N-(hydroxypropyl-thiosulfobetaine), 60 mgm./l. of 3-methyl-pyridinium-N-(hydroxypropyl-thiosulfobetaine or 100 mgm./l. of isoquinolinium-N-(hydroxypropyl-thiosulfobetaine) may be used with equal success.

Example II

Using a procedure analogous to that described in Example I, 46.5 parts by weight of 3-methyl-pyridine (0.5 mol) dissolved in 80 parts by volume of water were reacted with 46.2 parts by weight of epichlorohydrin (0.5 mol) accompanied by controlled addition of a total of 250 parts by volume of 2 N hydrochloric acid solution. After addition of 124 parts by weight of solid crystalline sodium thiosulfate (0.5 mol) the reaction mixture was heated for 3 hours at 80 to 90° C., and was then evaporated under reduced pressure to dryness. The viscous mass which remained behind was boiled several times with a total of 1 liter of methanol. The methanolic solution was separated and evaporated. After driving off the methanol a clear, colorless, viscous oil was obtained with very good yield, which slowly solidified into a crystalline mass. For further purification the 3-methyl-pyridinium-N-(hydroxypropyl-thiosulfobetaine) thus obtained was recrystallized from a lower alkanol, for instance, from 4.5 times the amount of methanol. The thiosulfobetaine had a melting point of 133 to 134° C.

Example III

Following a procedure analogous to that described in the preceding example, 46.5 parts by weight of 4-methyl-pyridine (0.5 mol) dissolved in 80 parts by volume of water were reacted with 46.2 parts by weight of epichlorohydrin (0.5 mol) accompanied by controlled addition of 182.5 parts by weight of 10% hydrochloric acid solution (0.5 mol). After addition of 124 parts by weight of crystalline sodium thiosulfate (0.5 mol) the reaction mixture was heated for 3 hours at 80 to 90° C. and was then allowed to crystallize in a cool place. 62.2 parts by weight of 4-methyl-pyridinium-N-(hydroxypropyl-thiosulfobetaine), corresponding to a yield of 47.3% of theory, were obtained. By concentrating the mother liquor, an additional yield of the product was obtained. The thiosulfobetaine was recrystallized from water and had a melting point of 183 to 186° C. (decomposition).

Example IV 250 parts by volume of 2 N hydrochloric acid were added over the course of about 4 hours at 40° C. in the manner previously described, that is, under constant control of the pH value, to a vigorously stirred mixture of 64.5 parts by weight of isoquinoline (0.5 mol), 46.2 parts by weight of epichlorohydrin (0.5 mol) and 125 parts by weight of water. After addition of a solution of 124 parts by weight of crystalline sodium thiosulfate (0.5 mol) in 124 parts by weight of water, the mixture was heated for 3 hours at 85° C. The reaction mixture was allowed to cool. The oil which had separated out upon cooling was then isolated in a separating funnel. By stirring the oil with 8 times its amount of methanol, isoquinolinium-N-(hydroxypropyl-thiosulfobetaine) became crystalline, yielding 64.2 parts by weight which corresponds to a yield of 43% of theory. For purification, the product was recrystallized from 10 times its amount of water. The substance had a melting point of 207° C. (decomposition).

The preceding examples are illustrative of the process of the invention and are not to be deemed limitative. It will be readily apparent to those skilled in the art that the present invention is not limited to the specific embodiments, and that various changes and modifications may be made without departing from the spirit of the invention or the scope of the appended claims.

I claim:
1. A mixture of thiosulfobetaines of the formula

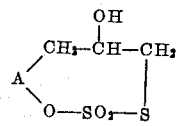

and

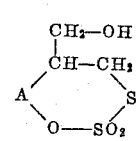

wherein A represents a pentavalent nitrogen compound selected from the group consisting of pyridinium, quinolinium, isoquinolinium and substituted derivatives thereof containing substituents selected from the group consisting of lower alkyl groups and halogens.

2. A process for the production of a mixture of isomeric thiosulfobetaines containing hydroxyl groups of heterocyclic bases containing a pentavalent nitrogen atom which comprises the steps of reacting an aromatic heterocyclic compound in which a tertiary nitrogen atom is part of the heterocyclic aromatic ring, with epichlorohydrin in the presence of water and in the presence of an agent capable of neutralizing a base, reacting the quarternary salt obtained with a neutral thiosulfate salt in the presence of water, and recovering said mixture of isomeric thiosulfobetaines.

3. The process of claim 2 wherein said reaction of an aromatic heterocyclic compound with epichlorohydrin is conducted at a pH of from about 7 to about 8.

4. A process for the production of a mixture of thiosulfobetaines of the formula

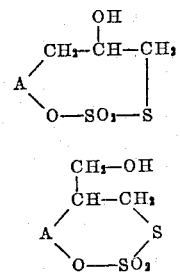

and wherein A represents a pentavalent nitrogen compound selected from the group consisting of pyridinium, quinolinium, isoquinolinium and substituted derivatives thereof containing substituents selected from the group consisting of lower alkyl groups and halogens which comprises the steps of reacting an aromatic nitrogen compound selected from the group consisting of pyridine, quinoline, isoquinoline and substituted derivatives thereof containing substituents selected from the group consisting of lower alkyl groups and halogens, with epichlorohydrin in the presence of water at a pH which does not exceed 8 during the reaction, said pH being controlled by the gradual introduction of an acid, reacting the resultant mixed isomers of the formula

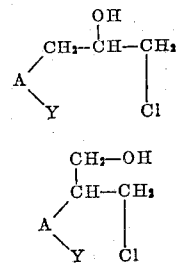

and wherein A has the above-noted meaning and Y represents the anion of an acid, with a neutral thiosulfate salt in the presence of water, and recovering said mixture of isomeric thiosulfobetaines.

5. The process of claim 4 wherein the stoichiometric amount of said acid is added to the reaction mixture.

6. A process for the production of pyridinium-N-(hydroxypropyl-thiosulfobetaine) which comprises the steps of reacting pyridine with epichlorohydrin and hydrochloric acid in the presence of water, said hydrochloric acid being added to the reaction at such a rate that the pH of the reaction mixture is maintained between 7 and 8, reacting the resultant aqueous mixture with sodium thiosulfate at a temperature between about 40° C. and 100° C., and recovering said pyridinium-N-(hydroxypropyl-thiosulfobetaine).

References Cited

UNITED STATES PATENTS 3,280,130  10/1966  Gundel _____ 260—294.8

JOHN D. RANDOLPH, Primary Examiner.

WALTER A. MODANCE, Examiner.

A. L. ROTMAN, Assistant Examiner.